(12) United States Patent
Hasegawa et al.

(10) Patent No.: US 8,329,802 B2
(45) Date of Patent: Dec. 11, 2012

(54) SURFACE-TREATED CALCIUM CARBONATE AND PASTE RESIN COMPOSITION CONTAINING SAME

(75) Inventors: Hisashi Hasegawa, Nishinomiya (JP); Yoshisada Kayano, Nishinomiya (JP)

(73) Assignee: Shiraishi Kogyo Kaisha, Ltd., Osaka (JP)

( * ) Notice: Subject to any disclaimer, the term of this patent is extended or adjusted under 35 U.S.C. 154(b) by 0 days.

(21) Appl. No.: 13/258,673

(22) PCT Filed: Mar. 18, 2010

(86) PCT No.: PCT/JP2010/054636
§ 371 (c)(1), (2), (4) Date: Sep. 22, 2011

(87) PCT Pub. No.: WO2010/110161
PCT Pub. Date: Sep. 30, 2010

(65) Prior Publication Data
US 2012/0035312 A1 Feb. 9, 2012

(30) Foreign Application Priority Data
Mar. 27, 2009 (JP) ................................. 2009-078831

(51) Int. Cl.
*C08K 3/26* (2006.01)
(52) U.S. Cl. ........................................ 524/425; 524/427
(58) Field of Classification Search .................. 524/425, 524/427
See application file for complete search history.

(56) References Cited

U.S. PATENT DOCUMENTS

| 6,686,044 B2 * | 2/2004 | Nakai et al. ................... 428/403 |
| 7,186,763 B2 | 3/2007 | Kayano et al. |
| 7,863,367 B2 * | 1/2011 | Takahashi et al. ............ 524/425 |
| 7,865,367 B2 | 1/2011 | Carro |

FOREIGN PATENT DOCUMENTS

| JP | 8-231760 A | 9/1996 |
| JP | 11-106215 A | 4/1999 |
| JP | 2003-147227 A | 5/2003 |
| JP | 2003-171121 A | 6/2003 |
| JP | 2004-345932 A | 12/2004 |
| JP | 2007-197585 A | 8/2007 |
| JP | 2008-222493 A | 9/2008 |
| WO | 2004/031303 A1 | 4/2004 |

OTHER PUBLICATIONS

International Search Report of PCT/JP2010/054636, mailing date Jun. 15, 2010.
Notification of Transmittal of Copies of Translation of the International Preliminary Report on Patentability (Form PCT/IB/338) of International Application No. PCT/JP2010/054636 mailed Nov. 24, 2011 with Forms PCT/IB/373 and PCT/ISA/237.

* cited by examiner

*Primary Examiner* — Peter Szekely
(74) *Attorney, Agent, or Firm* — Westerman, Hattori, Daniels & Adrian, LLP (57) ABSTRACT

The invention provides a surface-treated calcium carbonate that when incorporated into a paste resin, can impart low viscosity and high thixotropy and offers excellent storage stability, and paste resin compositions containing the same. The surface-treated calcium carbonate is a calcium carbonate surface-treated with a surface treatment agent containing a sodium salt or potassium salt of a fatty acid, wherein the total content of a sodium salt and a potassium salt of lauric acid, a sodium salt and a potassium salt of palmitic acid and a sodium salt and a potassium salt of stearic acid in the surface treatment agent is 80% by weight or more, the content of the sodium salt and potassium salt of lauric acid is within the range of 30% to 60% by weight, the content of a sodium salt and a potassium salt of an unsaturated fatty acid in the surface treatment agent is 5% by weight or less, and the BET specific surface area is 10 m$^2$/g or more.

12 Claims, 1 Drawing Sheet

SURFACE-TREATED CALCIUM CARBONATE AND PASTE RESIN COMPOSITION CONTAINING SAME

TECHNICAL FIELD

This invention relates to surface-treated calcium carbonate and paste resin compositions containing the same.

BACKGROUND ART

For inks, paints, sealants, PVC sols, acrylic sols and the like, they are first prepared in the form of a paste sol and the paste sol is then used to implement coating, painting, application, mixing or other operations. If properties, quality or other conditions of a cured product do not allow the incorporation of so much filler into the paste sol, there is used a filler capable of imparting, even in a small amount, a high viscosity to the sol, such as fumed silica.

Fumed silica allows the sol to exhibit high thixotropy, however, simultaneously providing high viscosity. Furthermore, fumed silica also presents a problem in that it extremely changes the sol viscosity with a very small variation in additive amount.

Meanwhile, calcium carbonate is used as a filler for various polymeric materials, such as plastics, rubbers, inks, paints, sealants, PVC sols, and acrylic sols. Therefore, if the addition of calcium carbonate can impart high thixotropy to these materials, calcium carbonate can be used as a relatively inexpensive thixotropy imparting agent.

Patent Literature 1 discloses a surface-treated calcium carbonate that is a calcium carbonate surface-treated with an unsaturated fatty acid and a saturated fatty acid in a predetermined mixture ratio. When this surface-treated calcium carbonate is used and added to inks, paints, sealants, PVC sols, acrylic sols and the like, high thixotropy can be imparted to these materials.

However, from viewpoints of environmental health and other factors, consideration has recently been given to saving the usage of diluent, plasticizer and the like. With the use of the surface-treated calcium carbonate in the above known technique, the materials can achieve high thixotropy but increases the viscosity, which makes it difficult to save the usage of diluent and plasticizer. Therefore, there is demand for a surface-treated calcium carbonate capable of imparting high thixotropy together with low viscosity.

Patent Literature 2 also proposes a surface-treated calcium carbonate for imparting high thixotropy. However, also with the use of the surface-treated calcium carbonate disclosed in this known technique, it is difficult to impart both of low viscosity and high thixotropy.

Patent Literature 3 proposes a calcium carbonate surface-treated with a surface treatment agent containing lauric acid and myristic acid in a total content of 85% or more. However, also with the use of this surface-treated calcium carbonate, it is difficult to impart both of low viscosity and high thixotropy.

CITATION LIST

Patent Literature

Patent Literature 1: JP-A-2003-171121
Patent Literature 2: JP-A-2007-197585
Patent Literature 3: WO2004/031303

SUMMARY OF INVENTION

Technical Problem

An object of the present invention is to provide a surface-treated calcium carbonate that when incorporated into a paste resin, can impart low viscosity and high thixotropy thereto and offers good storage stability, and paste resin compositions containing the surface-treated calcium carbonate.

Solution to Problem

A surface-treated calcium carbonate according to the present invention is a calcium carbonate surface-treated with a surface treatment agent containing a sodium salt or potassium salt of lauric acid and also containing a sodium salt or potassium salt of palmitic acid and/or a sodium salt or potassium salt of stearic acid, wherein the total content of the sodium salt or potassium salt of lauric acid, the sodium salt or potassium salt of palmitic acid and the sodium salt or potassium salt of stearic acid in the surface treatment agent is 80% by weight or more, the content of the sodium salt and potassium salt of lauric acid is within the range of 30% to 60% by weight, the content of a sodium salt and a potassium salt of an unsaturated fatty acid in the surface treatment agent is 5% by weight or less, and the BET specific surface area is 10 $m^2/g$ or more.

The present invention realizes a surface-treated calcium carbonate that when incorporated into a paste resin, can impart low viscosity and high thixotropy thereto and offers good storage stability.

In the present invention, preferably, a sodium salt or potassium salt of an additional fatty acid is a sodium salt or potassium salt of a fatty acid having a carbon number of 14 to 22.

Furthermore, in the present invention, the BET specific surface area of the surface-treated calcium carbonate is preferably within the range of 10 to 100 $m^2/g$.

In the present invention, preferably, 100 parts by weight of the calcium carbonate is treated with 2 to 15 parts by weight of the surface treatment agent.

Furthermore, in the present invention, preferably, the amount of extracted fatty acid obtained by subjecting the surface-treated calcium carbonate to extraction with diethyl ether is 0.4% by weight or less.

A polyurethane paste resin composition according to the present invention is characterized by containing the surface-treated calcium carbonate according to the present invention.

A modified silicone paste resin composition according to the present invention is characterized by containing the surface-treated calcium carbonate according to the present invention.

A polysulfide paste resin composition according to the present invention is characterized by containing the surface-treated calcium carbonate according to the present invention.

A polyvinyl chloride sol resin composition according to the present invention is characterized by containing the surface-treated calcium carbonate according to the present invention.

A acrylic sol resin composition according to the present invention is characterized by containing the surface-treated calcium carbonate according to the present invention.

A printing ink composition according to the present invention is characterized by containing the surface-treated calcium carbonate according to the present invention.

A paint composition according to the present invention is characterized by containing the surface-treated calcium carbonate according to the present invention.

Advantageous Effects of Invention

The surface-treated calcium carbonate according to the present invention can be made a surface-treated calcium carbonate that when incorporated into a paste resin, can impart low viscosity and high thixotropy and offers good storage stability.

Since the paste resin compositions according to the present invention contain the above surface-treated calcium carbonate according to the present invention, they have low viscosity and high thixotropy and exhibit excellent storage stability.

DESCRIPTION OF EMBODIMENTS

The present invention will be described below in further detail.

(Calcium Carbonate Particles)

In the present invention, the type of calcium carbonate particles for use as an object of surface treatment is not particularly limited and includes any calcium carbonate particles so long as they can be used as a filler for various polymeric materials except silicone. Examples of such calcium carbonate include natural calcium carbonate (heavy calcium carbonate) and synthetic calcium carbonate (precipitated (colloidal) calcium carbonate). Natural calcium carbonate is produced directly from raw limestone and can be produced, for example, by mechanically grinding and classifying raw limestone.

Synthetic calcium carbonate is produced from calcium hydroxide and can be produced, for example, by reacting calcium hydroxide with carbon dioxide gas. Calcium hydroxide can be produced, for example, by reacting calcium oxide with water. Calcium oxide can be produced, for example, by calcining raw limestone in combination with coke or the like. In this case, carbon dioxide gas is generated during calcination. Therefore, calcium carbonate can be produced by reacting the carbon dioxide gas with calcium hydroxide.

Generally, materials slightly reduce their BET specific surface area by undergoing surface treatment. As described later, the BET specific surface area of the surface-treated calcium carbonate of the present invention is 10 $m^2/g$ or more. Therefore, the preferred calcium carbonate used is one whose BET specific surface area before undergoing surface treatment is slightly larger than 10 $m^2/g$.

(Sodium Salt and Potassium Salt of Lauric Acid)

In the present invention, calcium carbonate is surface-treated with a surface treatment agent containing 30% to 60% by weight of at least one of a sodium salt and a potassium salt of lauric acid. The preferred content of the sodium salt and potassium salt of lauric acid is within the range of 30% to 55% by weight; more preferred is within the range of 35% to 55% by weight; still more preferred is within the range of 40% to 55% by weight. If the content of the sodium salt and potassium salt of lauric acid is too small, this causes a paste resin obtained by incorporating them thereinto to have high viscosity and makes it impossible to impart to the paste resin high thixotropy together with low viscosity. On the other hand, if the content of the sodium salt and potassium salt of lauric acid is too large, this makes it difficult to provide high thixotropy.

The sodium salt of lauric acid and the potassium salt of lauric acid may be used alone or in combination. In the present invention, the sodium salt is particularly preferably used.

(Sodium Salt and Potassium Salt of Palmitic Acid and Sodium Salt and Potassium Salt of Stearic Acid)

The surface treatment agent in the present invention contains, along with the sodium salt and potassium salt of lauric acid, at least one of a sodium salt and a potassium salt of palmitic acid and a sodium salt and a potassium salt of stearic acid. The total content of the sodium salt and potassium salt of lauric acid, the sodium salt and potassium salt of palmitic acid, and the sodium salt and potassium salt of stearic acid in the surface treatment agent is 80% by weight or more. Since as described previously the content of the sodium salt and potassium salt of lauric acid is 60% by weight at maximum, the total content of the sodium salt and potassium salt of palmitic acid and the sodium salt and potassium salt of stearic acid is 20% by weight or more.

If the total content of the sodium salt and potassium salt of lauric acid, the sodium salt and potassium salt of palmitic acid, and the sodium salt and potassium salt of stearic acid in the surface treatment agent is less than 80% by weight, it is impossible to impart high thixotropy together with low viscosity. Since in the present invention calcium carbonate is treated with the surface treatment agent containing a sodium salt and a potassium salt of lauric acid in the above predetermined content and also containing at least one of a sodium salt and a potassium salt of palmitic acid and a sodium salt and a potassium salt of stearic acid, it can impart high thixotropy together with low viscosity. Although the details of the reasons for this are not completely clear, they may be presumed as follows.

Figure 1:
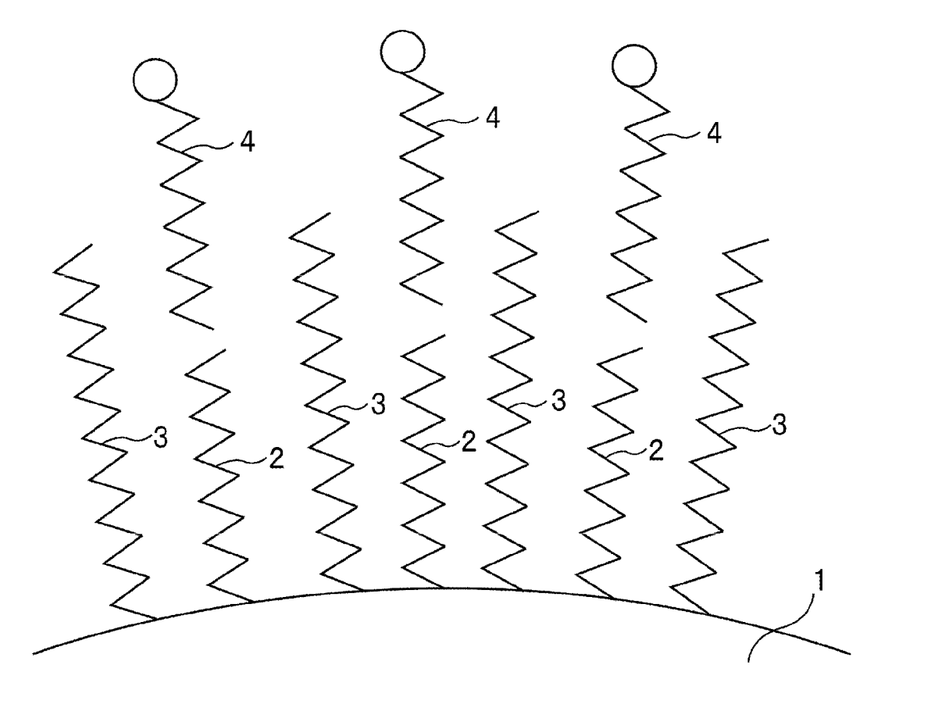
FIG. 1 is an illustration schematically showing a surface state of a surface-treated calcium carbonate according to the present invention.

FIG. 1 is an illustration schematically showing the surface of a calcium carbonate surface-treated in accordance with the present invention.

As shown in FIG. 1, the surface of calcium carbonate 1 has lauric acid 2 of relatively small chain length and palmitic acid or stearic acid 3 of relatively large chain length both adsorbed thereon by being surface-treated. In the present invention, the lauric acid 2 and the palmitic acid and/or stearic acid 3 are mixed in the predetermined proportion and a chain of the lauric acid 2 of small chain length is present between chains of the palmitic acid and/or stearic acid 3 of large chain length. Therefore, organic material chains 4 in a matrix resin can enter the regions of chains of the lauric acid 2 of small chain length. Therefore, it can be considered that the organic material chains 4 are likely to be interacted with the palmitic acid and/or stearic acid 3 and the lauric acid 2 which serve as a surface treatment agent on the surface of the calcium carbonate 1, thereby increasing the structural viscosity to provide high thixotropy.

The palmitic acid and stearic acid may be in the form of either a sodium salt or a potassium salt but are preferably used in the form of a sodium salt.

(Sodium Salt and Potassium Salt of Additional Fatty Acid)

The surface treatment agent in the present invention may contain, along with the above sodium salt and potassium salt of lauric acid, the sodium salt and potassium salt of palmitic acid, and the sodium salt and potassium salt of stearic acid, one or more sodium salts or potassium salts of one or more additional fatty acids.

Examples of the additional fatty acids include fatty acids having a carbon number of 14 and fatty acids having a carbon number of 20 to 31. More preferred are fatty acids having a carbon number of 14 and fatty acids having a carbon number of 20 to 26, and still more preferred are fatty acids having a carbon number of 14 and fatty acids having a carbon number of 20 to 22. Specific examples of such fatty acids include myristic acid, aryne acid, behenic acid, lignoceric acid, cerotic acid, montanic acid, and melissic acid. The additional fatty acids are used in the form of a fatty acid sodium salt and/or a fatty acid potassium salt. In the present invention, the additional fatty acids are particularly preferably used in the form of a sodium salt.

(Sodium Salt and Potassium Salt of Unsaturated Fatty Acid)

In the present invention, as described above, calcium carbonate is surface-treated with a surface treatment agent containing a sodium salt or potassium salt of lauric acid and a sodium salt or potassium salt of palmitic acid and/or stearic acid. The surface treatment agent may contain one or more sodium salts or potassium salts of one or more unsaturated fatty acids as one or more sodium salts or potassium salts of one or more additional fatty acids, but preferably has a content thereof of 5% by weight or less. If the content of the sodium salts and potassium salts of unsaturated fatty acids exceeds 5% by weight, the storage stability is deteriorated. In particular, the viscosity tends to be decreased as a result of storage over a long time. The more preferred content of the sodium salts and potassium salts of unsaturated fatty acids is 4% by weight or less, still more preferred is 3% by weight or less, and even still more preferred is 2% by weight or less.

Specific examples of the unsaturated fatty acids include oleic acid, erucic acid, and linoleic acid.

(Surface Treatment Agent)

In the surface treatment agent in the present invention, as described above, the total content of the sodium salt and potassium salt of lauric acid, the sodium salt and potassium salt of palmitic acid, and the sodium salt and potassium salt of stearic acid is 80% by weight or more, the content of the sodium salt and potassium salt of lauric acid is within the range of 30% to 60% by weight, and the content of the sodium salts and potassium salts of unsaturated fatty acids is 5% by weight or less. Provided that these conditions are satisfied, the surface treatment agent may contain one or more surface treatment agents other than the sodium salt and potassium salt of lauric acid, the sodium salt and potassium salt of palmitic acid, the sodium salt and potassium salt of stearic acid, and the sodium salts and potassium salts of the additional fatty acids. For example, so long as the effects of the present invention are not lost, lauric acid, palmitic acid, stearic acid, and one or more additional fatty acids may be contained in an acid form. Furthermore, a sulfonic acid salt, such as an alkylbenzenesulfonic acid salt, or a sodium salt or potassium salt of a resin acid may be contained so long as the effects of the present invention are not lost.

(Surface-Treated Calcium Carbonate)

A surface-treated calcium carbonate according to the present invention is a calcium carbonate surface-treated with the surface treatment agent as described above.

The BET specific surface area of the surface-treated calcium carbonate of the present invention is 10 m²/g or more. If the BET specific surface area is less than 10 m²/g, the surface-treated calcium carbonate cannot provide high thixotropy. The BET specific surface area is preferably within the range of 10 to 100 m²/g. Generally, it is often difficult to produce calcium carbonate having a BET specific surface area larger than 100 m²/g. The more preferred BET specific surface area is within the range of 10 to 60 m²/g, and still more preferred is within the range of 15 to 40 m²/g.

The amount of surface treatment agent for the treatment is preferably 2 to 15 parts by weight, more preferably 2 to 10 parts by weight, still more preferably 2.5 to 5 parts by weight, based on 100 parts by weight of calcium carbonate. In the present invention, the amount of surface treatment agent for the treatment can appropriately be controlled in consideration of the BET specific surface area of calcium carbonate to be surface-treated and other factors.

If the amount of surface treatment agent for the treatment is too small, the effects of the present invention imparting low viscosity and high thixotropy may not sufficiently be achieved. On the other hand, if the amount of surface treatment agent for the treatment is too large, the effects proportional to the amount of surface treatment agent for the treatment cannot be obtained and the cost rises, which is economically disadvantageous.

In the present invention, the amount of extracted fatty acid obtained by subjecting the surface-treated calcium carbonate to extraction with diethyl ether is preferably 0.4% by weight or less.

In the present invention, calcium carbonate is surface-treated with a surface treatment agent containing a sodium salt or potassium salt of lauric acid and a sodium salt or potassium salt of palmitic acid and/or stearic acid. An example of a method for surface treatment is, as described later, to treat calcium carbonate by adding a surface treatment agent to a slurry liquid of calcium carbonate particles and stirring them. It can be considered that sodium salts or potassium salts of fatty acids, including lauric acid, added to the slurry liquid of calcium carbonate particles react with calcium present on the surface of calcium carbonate into calcium salts of the fatty acids including lauric acid. The calcium salts of the fatty acids including lauric acid are less likely to be dissolved in diethyl ether. Therefore, when the surface-treated calcium carbonate is subjected to extraction with diethyl ether as described previously, diethyl ether can dissolve out lauric acid, palmitic acid, stearic acid, and additional fatty acids, all in the form of an acid having attached to the surface of the surface-treated calcium carbonate, and fatty acid salts having remained in the form of a sodium salt or a potassium salt, thus extracting these fatty acids and fatty acid salts. In the present invention, the amount of extracted fatty acid is defined as an index representing the content of such fatty acids attached in an acid form and such fatty acid salts attached in the form of a sodium salt or potassium salt. The amount of extracted fatty acid can be determined from the following equation.

$$\text{Amount of extracted fatty acid (\% by weight)} = \{((\text{weight of surface-treated calcium carbonate before extraction}) - (\text{weight of surface-treated calcium carbonate after extraction}))/(\text{weight of surface-treated calcium carbonate before extraction})\} \times 100$$

The content of fatty acids, including lauric acid, attached in the form of an acid, a sodium salt or a potassium salt to the surface of the surface-treated calcium carbonate can be determined from the amount of extracted fatty acid.

In the present invention, the amount of extracted fatty acid is preferably 0.4% by weight or less, more preferably 0.3% by weight or less, and still more preferably 0.25% by weight or less. If the amount of extracted fatty acid is too large, high thixotropy cannot be achieved and the viscosity increases during storage over a long time, resulting in deteriorated storage stability. The lower limit of the amount of extracted fatty acid is not particularly limited but is 0.05% by weight or more, for example.

In the present invention, the composition of the surface treatment agent in the surface-treated calcium carbonate can be determined by measuring the components in the surface treatment agent obtained after the surface-treated calcium carbonate is decomposed by an acid, for example, using gas chromatography. Furthermore, the content of the surface treatment agent can be measured, for example, by differential thermal analysis.

(Production of Surface-Treated Calcium Carbonate)

The surface-treated calcium carbonate according to the present invention can be produced by adding the above-described surface treatment agent to a slurry liquid of calcium carbonate particles and stirring them. As described above, the surface treatment can be implemented so that the sodium salts or potassium salts of fatty acids, including lauric acid, react with calcium on the surface of calcium carbonate into insoluble calcium salts. The slurry liquid of surface-treated calcium carbonate is then dewatered and dried, thereby obtaining a powder of surface-treated calcium carbonate.

The calcium carbonate solid content in the slurry liquid of calcium carbonate can appropriately be controlled in consideration of dispersibility of calcium carbonate particles, ease of dewatering and other factors. Furthermore, the solid content can appropriately be controlled as by the particle diameter of calcium carbonate particles. In general, a slurry liquid having an appropriate viscosity can be obtained by controlling the solid content in the slurry to be 2% to 30% by weight, preferably about 5% to about 20% by weight. If the amount of water used is too large, this makes the dewatering difficult and is undesirable also from the viewpoint of effluent processing.

(Paste Resin Composition)

When the surface-treated calcium carbonate according to the present invention is incorporated into a paste resin, such as ink, paint, sealant, PVC sol, DOP sol or acrylic sol, it can impart low viscosity and high thixotropy to the paste resin and even offers good storage stability. The amount of surface-treated calcium carbonate incorporated into the paste resin can appropriately be controlled depending upon incorporation purposes, properties required for the paste resin, and other factors.

(Polyurethane Paste Resin Composition)

Polyurethane paste resin compositions that can be used, for example, as polyurethane sealants, mainly contain isocyanate, polyol, a plasticizer, a filler, and other additives.

Examples of the isocyanate include tolylene diisocyanate (TDI), 4,4-diphenylmethane diisocyanate (MDI), 1,5-naphthalene diisocyanate, tolidine diisocyanate (TODI), xylene diisocyanate, hexamethylene diisocyanate and its modified products, dicyclohexylmethane diisocyanate (hydrogenated MDI), and isophorone diisocyanate (IPDI).

Examples of the polyol include dicarboxylic acids, such as adipic acid, phthalic acid, sebacic acid, and dimer acid; and glycols, such as ethylene glycol, diethylene glycol, propylene glycol, butylene glycol, 1,3-butanediol, hexanetriol, and trimethylolpropane. Other examples of the polyol include esters of the type in which caprolactone is ring-opening polymerized.

Examples of the plasticizer include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), ditridecyl phthalate (DTDP), butyl benzyl phthalate (BBP), dicyclohexyl phthalate (DCHP), tetrahydrophthalic acid esters, dioctyl adipate (DOA), diisonynol adipate (DINA), diisodecyl adipate (DIDA), di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tri(chloroethyl) phosphate (TCEP), trisdichloropropyl phosphate (CRP), tributoxyethyl phosphate (TBXP), tris(β-chloropropyl) phosphate (TMCPP), triphenyl phosphate (TPP), octyl diphenyl phosphate (CDP), acetyl triethyl citrate, and tributyl acetylcitrate. Other plasticizers include trimellitate plasticizers, polyester plasticizers, chlorinated paraffin, stearate plasticizers, and also dimethyl polysiloxane.

Examples of the filler (including thickener) include inorganic fillers and organic fillers. The inorganic fillers include calcium carbonate (natural and synthetic products), calcium-magnesium carbonate (natural and synthetic products), basic magnesium carbonate, quartz powder, silica powder, finely-divided silica (dry-process, wet-process and gel-process products), finely-divided calcium silicate, finely-divided aluminum silicate, kaolin clay, pyrophyllite clay, talc, sericite, mica, bentonite, nepheline-syenite, aluminum hydroxide, magnesium hydroxide, barium sulfate, carbon black (furnace, thermal, and acetylene), and graphite; examples of acicular and fibrous inorganic fillers include sepiolite, wollastonite, xonotlite, potassium titanate, carbon fibers, mineral fibers, glass fibers, Shirasu balloons, fly ash balloons, glass balloons, silica beads, alumina beads, and glass beads. The organic fillers include powdered or bead-like organic fillers, such as wood powder, walnut powder, cork powder, wheat flour, starch, ebonite powder, rubber powder, lignin, phenolic resins, high-styrene resins, polyethylene resins, silicone resins, and urea resins; and fibrous organic fillers, such as cellulose powder, pulp powder, synthetic fiber powder, amide wax, and castor oil wax.

The compounding ratio of the surface-treated calcium carbonate to the polyurethane paste resin composition according to the present invention is preferably 10 to 400 parts by weight, more preferably 10 to 300 parts by weight, based on 100 parts by weight of the total amount of resin components (including plasticizer) and liquid additives.

(Modified Silicone Paste Resin Composition)

Modified silicone paste resin compositions, such as modified silicone sealants, consist essentially of a modified silicone resin, a plasticizer, a filler, and other additives. Modified silicone paste resin compositions are resins in which a polymer is modified by introducing a reactive silicone functional group to a terminal end of the polymer and which are completely different in molecular structure from silicone resins.

The modified silicone resin used is, for example, one produced in the following manner. A terminal hydroxyl group of polyoxypropylene glycol is converted to an alkoxide group. Then, the obtained product is reacted with a polyvalent halogen compound to increase the molecular weight, further increased in molecular weight through a molecular weight increasing reaction, then reacted with an organic halogen compound represented by $CH_2=CHRX$ to introduce an olefin group to a terminal end, then subjected to a dechlorination and refining process, and subjected to a hydrosilylation reaction to introduce a reactive silicone functional group to a terminal end, thereby producing a modified silicone resin.

Plasticizers, fillers and other additives that can be used are the same as described for the polyurethane paste resin composition.

The compounding ratio of the surface-treated calcium carbonate to the resin composition is preferably 10 to 400 parts by weight, more preferably 10 to 300 parts by weight, based on 100 parts by weight of the total amount of the modified silicone resin, plasticizer, and liquid additives.

(Polysulfide Paste Resin Composition)

Polysulfide paste resin compositions, such as polysulfide sealants, mainly contain a polysulfide resin, a plasticizer, a filler, and other additives.

The polysulfide resin used is, for example, one produced in the following manner. A starting material is dichloroethyl formal obtained by reacting paraformaldehyde with ethylene chlorohydrin obtained by reaction between ethylene oxide and hydrochloric acid. Dichloroformal is added with stirring and heating to a colloidal suspension containing sodium polysulfide and small amounts of activator and magnesium hydroxide to produce a polysulfide resin.

In recent years, a modified polysulfide resin has often been used which has an SH group (mercapto group) at its molecular weight end and an urethane bond in its main chain.

Plasticizers, fillers and other additives that can be used are the same as described for the polyurethane paste resin composition.

The compounding ratio of the surface-treated calcium carbonate to the resin composition is preferably 10 to 400 parts by weight, more preferably 10 to 300 parts by weight, based on 100 parts by weight of the total amount of the polysulfide resin (modified polysulfide resin), plasticizer, and liquid additives.

(Polyvinyl Chloride Sol Resin Composition)

Polyvinyl chloride sol resin compositions mainly contain a polyvinyl chloride resin, a plasticizer, a filler, and other additives. Plasticizers, fillers and other additives that can be used are the same as described for the polyurethane paste resin composition.

The compounding ratio of the surface-treated calcium carbonate to the resin composition is preferably 10 to 400 parts by weight, more preferably 10 to 300 parts by weight, based on 100 parts by weight of the total amount of the polyvinyl chloride resin, plasticizer, and liquid additives.

(Acrylic Sol Resin Composition)

Acrylic sol resin compositions mainly contain an acrylic resin, a crosslinker, a plasticizer, a filler, and other additives.

Monomers that can form acrylic resins are classified broadly in terms of methacrylic monomers into nonfunctional monomers, monofunctional monomers, and multifunctional monomers. Examples of the nonfunctional monomers include methyl methacrylate, ethyl methacrylate, propyl methacrylate, butyl methacrylate, isobutyl methacrylate, tert-butyl methacrylate, 2-ethylhexyl methacrylate, octyl methacrylate, isodecyl methacrylate, lauryl methacrylate, lauryl-tridecyl methacrylate, tridecyl methacrylate, cetyl-stearyl methacrylate, stearyl methacrylate, cyclohexyl methacrylate, and benzyl methacrylate. Examples of the monofunctional monomers include methacrylic acid, 2-hydroxyethyl methacrylate, 2-hydroxypropylmethacrylate, dimethylaminoethyl methacrylate, diethylaminoethyl methacrylate, tert-butylaminoethyl methacrylate, glycidyl methacrylate, and tetrahydrofurfuryl methacrylate. Examples of the multifunctional monomers include ethylene dimethacrylate, diethylene glycol dimethacrylate, triethylene glycol dimethacrylate, tetraethylene glycol dimethacrylate, decaethylene glycol dimethacrylate, pentadecaethylene glycol dimethacrylate, pentacontahectaethylene glycol dimethacrylate, 1,3-butylene dimethacrylate, allyl methacrylate, trimethylolpropane trimethacrylate, pentaerythritol tetramethacrylate, and diethylene glycol dimethacrylate phthalate. The acrylic resin can be produced by copolymerizing one or more of the above nonfunctional monomers with one or more of the above monofunctional monomers and/or one or more of the above multifunctional monomers.

Examples of the crosslinker include amino resins, isocyanate compounds, and epoxy resins. Plasticizers and fillers that can be used are the same as described for the polyurethane sealants.

The compounding ratio of the surface-treated calcium carbonate to the resin composition is preferably 10 to 400 parts by weight, more preferably 10 to 300 parts by weight, based on 100 parts by weight of the total amount of the acrylic resin, plasticizer, and liquid additives.

(Printing Ink Composition)

Printing ink compositions mainly contain a colorant, a vehicle, and additives.

Colorants include pigments including inorganic and organic pigments, and dyes. Examples of the inorganic pigments include titanium oxide, carbon black, bronze powder, disazo yellow, Brilliant Carmine 6B, Lake Red C, phthalocyanine blue, Methyl Violet Lake, and daylight fluorescent pigments. Examples of the organic pigments include insoluble azo pigments, azo lake pigments, phthalocyanine pigments, and dyeing lake pigments. Examples of the dyes include eosin, Victorian blue, nigrosine, and C.I. Disperse Red 60. Furthermore, extender pigments are also known as colorants and typically, for example, calcium carbonate is often used as an extender pigment. The extender pigment is used for the purposes of controlling the fluidity, coloring power, hiding power, gross, and other characteristics of printing inks.

The vehicle consists essentially of an oil, a resin, a solvent, and additives.

Examples of oil types include vegetable oil, processed oil, and mineral oil. Examples of vegetable oils mainly used are linseed oil and China-wood oil, examples of processed oils used are thermally modified vegetable oils, maleated oils, urethane oils, and vinylated oils, and examples of mineral oils used are machine oil and spindle oil.

Examples of the resin include as natural resins gum rosin, wood rosin, tall oil rosin, and their derivatives; and include as synthetic resins rosin-modified phenolic, urea and melamine resins, ketone resin, polyvinyl chloride, vinyl chloride-vinyl acetate copolymer resin, polyvinyl butyral (butyral resin), styrene-maleic acid resin, chlorinated polypropylene, acrylic resin, coumarone-indene resin, petroleum resin, polyester resin, alkyd resin, polyamide resin, epoxy resin, polyurethane, nitrocellulose (pyroxylin), ethylcellulose, ethylhydroxyethyl cellulose (EHEC), cyclized rubber, and chlorinated rubber.

Examples of the solvent include n-hexane, n-heptane, rubber solvent (Gasoline for Industrial Purpose Grade 2), mineral spirit, high-boiling petroleum solvent (ink oil), cyclohexane, toluene, xylene, solvent naphtha, tetralin, dipentene, methyl alcohol, ethyl alcohol, n-propyl alcohol, isopropyl alcohol (IPA), n-butyl alcohol, secondary butyl alcohol, isobutyl alcohol, cyclohexyl alcohol, 2-methylcyclohexyl alcohol, tridecyl alcohol (tridecanol), methyl acetate, ethyl acetate, isopropyl acetate, butyl acetate, acetone, methyl ethyl ketone (MEK), methyl isobutyl ketone (MIBK), cyclohexanone (anone), methylcyclohexanone, diacetone alcohol (DAA), isophorone, ethylene glycol, propylene glycol, diethylene glycol, triethylene glycol, dipropylene glycol, ethylene glycol monobutyl ether (butyl Cellosolve), propylene glycol monomethyl ether, propylene glycol monoethyl ether, propylene glycol monobutyl ether (butyl Carbitol), diethylene glycol monobutyl ether acetate (butyl Cellosolve acetate), propylene glycol monomethyl ether acetate, propylene glycol monoethyl ether acetate, diethylene glycol monobutyl ether acetate (butyl Carbitol acetate).

The additives include wax, drier, dispersant, and lubricant. Examples of the wax used include as vegetable waxes carnauba wax and Japan wax, include as animal waxes beeswax and anhydrous lanolin (wool wax), include as mineral waxes paraffin wax, microcrystalline wax, montan wax, ozocerite wax (earth wax), petrolatum, and Vaseline, and include as synthetic waxes polyethylene wax, polytetrafluoroethylene (PTFE), chlorinated paraffin, and fatty acid amide. Examples of the drier include liquid driers in which metallic soap is dissolved in fat, and paste driers in which manganese borate, lead borate, lead acetate or the like is dispersed in drying oil varnish. The dispersant and lubricant are divided into oil-based and water-based dispersants. Examples of the oil-based dispersant used include lecithin, sorbitan fatty acid esters, partial fatty acid esters of polyacrylic acid, alkylamine fatty acid salts, alkyldiamine, alkyltriamine, and naphthenic acid metal soap, and also include dispersants having the following trade names: Solsperse, produced by ICI; Anti-Terra, produced by Byk-Mallinckrodt; and Disparlon, produced by Kusumoto Chemicals, Ltd. Examples of the water-based dispersant used include anion surfactants, such as formalin condensate of sodium naphthalenesulfonate, sodium lignin sulfonate, sodium alkyl sulfate, and sodium alkylarylsulfonate; non-ionic surfactants, such as polyoxyethylene alkyl ether, and polyoxyethylene aryl ether; and alkali-soluble resins, such as styrene-maleic acid resin, and polyacrylic acid derivatives.

The compounding ratio of the surface-treated calcium carbonate to the printing ink is preferably 0.01 to 50 parts by weight, more preferably 0.1 to 20 parts by weight, based on 100 parts by weight of the total amount of the colorant, vehicle, and additives.

(Paint Composition)

Paint compositions mainly contain a pigment, a vehicle, and additives.

The pigment is divided into inorganic and organic pigments. Examples of the inorganic pigment used include zinc white, titanium dioxide, iron red, iron black, chrome oxide, cobalt blue, titan yellow, silica, red lead, yellow iron oxide, alumina white, chrome yellow, zinc chromate, molybdenum red, iron blue, cadmium yellow, cadmium red, barium sulfate, calcium carbonate, ultramarine, manganese violet, carbon black, aluminum powder, bronze powder, and zinc dust. Examples of the organic pigment used include naphthol red, benzimidazolone bordeaux, First Yellow G, Disazo Yellow HR, condensed azo yellow, condensed azo red, Lake Red C, Brilliant Carmine 6B, nickel azo yellow, quinacridone red, quinacridone scarlet, perylene red, perylene maroon, perinone orange, thioindigo bordeaux, flavanthrone yellow, dianthraquinolyl red, indanthrene blue, dioxazine violet, quinophthalone yellow, pyrrole red, phthalocyanine green, phthalocyanine blue, isoindolinone yellow, and isoindoline yellow. Furthermore, an extender pigment may also be used as a pigment and typically, for example, calcium carbonate is often used as an extender pigment in the inorganic pigment. The extender pigment is used for the purposes of controlling, for example, the fluidity, coloring power, hiding power, gross and other characteristics of the paint.

The vehicle consists essentially of a resin, a curing agent, and a solvent. Examples of the resin used include acrylic resin, alkyd resin, polyester resin, epoxy resin, vinyl resin, cellulosic resin, and natural resin. Examples of the curing agent used include melamine resin, polyisocyanate, and polyamine resin. Examples of the solvent used include hydrocarbon solvents, ketone solvents, ester solvents, ether solvents, alcohol solvents, and water.

Examples of the additives mainly used include a leveling agent, a rheology modifier, a plasticizer, an emulsifier, a pigment dispersant, and a light stabilizer.

The compounding ratio of the surface-treated calcium carbonate to the paint is preferably 0.1 to 100 parts by weight, more preferably 0.3 to 50 parts by weight, based on 100 parts by weight of the total amount of the pigment, vehicle, and additives.

EXAMPLES

The present invention will hereinafter be specifically described by way of examples; however, it should be appreciated that the present invention is not limited to the following examples but may be embodied in various forms appropriately modified without departing from the spirit of the invention. Note that the sign "%" hereinafter refers to "% by weight" unless otherwise noted.

<Method for Producing Surface-Treated Calcium Carbonate>

Example 1

Water adjusted to 60° C. was added to 2 kg of synthetic calcium carbonate having a BET specific surface area of 24 $m^2/g$ to give a solid content of 10% by weight, and the mixture was prepared with a stirring disperser into a calcium carbonate slurry liquid. Added to the calcium carbonate slurry liquid with stirring using the disperser was 75 g of mixed fatty acid sodium salt in which 35 g of sodium laurate, 17.5 g of sodium stearate, and 17.5 g of sodium palmitate were mixed (50% sodium laurate, 25% sodium stearate, and 25% sodium palmitate). After five minutes of stirring, the slurry was dewatered under pressure.

The resultant dewatered cake was dried and powderized to produce approximately 2 kg of surface-treated calcium carbonate.

Example 2

A surface-treated calcium carbonate was produced in the same manner as in Example 1 described above except for the use of synthetic calcium carbonate having a BET specific surface area of 20 $m^2/g$.

Example 3

A surface-treated calcium carbonate was produced in the same manner as in Example 1 described above except for the use of 75 g of mixed fatty acid sodium salt in which 35 g of sodium laurate, 16.4 g of sodium palmitate, 16.5 g of sodium stearate, and 2.1 g of sodium oleate were mixed (50% sodium laurate, 23.4% sodium palmitate, 23.6% sodium stearate, and 3% sodium oleate).

Example 4

A surface-treated calcium carbonate was produced in the same manner as in Example 1 described above except for the use of 70 g of mixed fatty acid sodium salt in which 24.5 g of sodium laurate, 22.8 g of sodium palmitate, and 22.8 g of sodium stearate were mixed (35% sodium laurate, 32.5% sodium palmitate, and 32.5% sodium stearate).

Example 5

A surface-treated calcium carbonate was produced in the same manner as in Example 1 described above except for the use of 70 g of mixed fatty acid sodium salt in which 42 g of sodium laurate, 14 g of sodium palmitate, and 14 g of sodium stearate were mixed (60% sodium laurate, 20% sodium palmitate, and 20% sodium stearate).

Example 6

A surface-treated calcium carbonate was produced in the same manner as in Example 1 described above except for the use of synthetic calcium carbonate having a BET specific surface area of 35 m²/g and 200 g of mixed fatty acid sodium salt in which 100 g of sodium laurate, 50 g of sodium palmitate, and 50 g of sodium stearate were mixed (50% sodium laurate, 25% sodium palmitate, and 25% sodium stearate).

Example 7

A surface-treated calcium carbonate was produced in the same manner as in Example 1 described above except for the use of 70 g of mixed fatty acid sodium salt in which 35 g of sodium laurate, 11.2 g of sodium myristate, 11.9 g of sodium palmitate, 11.9 g of sodium stearate, and 1.4 g of sodium oleate were mixed (50% sodium laurate, 16% sodium myristate, 17% sodium palmitate, 17% sodium stearate, and 2% sodium oleate).

Comparative Example 1

A surface-treated calcium carbonate was produced in the same manner as in Example 1 described above except for the use of 70 g of mixed fatty acid sodium salt in which 49 g of sodium laurate, 10.5 g of sodium palmitate, and 10.5 g of sodium stearate were mixed (70% sodium laurate, 15% sodium palmitate, and 15% sodium stearate).

Comparative Example 2

A surface-treated calcium carbonate was produced in the same manner as in Example 1 described above except for the use of 70 g of mixed fatty acid sodium salt in which 14 g of sodium laurate, 28 g of sodium palmitate, and 28 g of sodium stearate were mixed (20% sodium laurate, 40% sodium palmitate, and 40% sodium stearate).

Comparative Example 3

A surface-treated calcium carbonate was produced in the same manner as in Example 1 described above except for the use of 70 g of mixed fatty acid sodium salt in which 35 g of sodium laurate, 15 g of sodium palmitate, 15 g of sodium stearate, and 5 g of sodium oleate were mixed (50% sodium laurate, 21.5% sodium palmitate, 21.5% sodium stearate, and 7% sodium oleate).

Comparative Example 4

A surface-treated calcium carbonate was produced in the same manner as in Example 1 described above except for the use of synthetic calcium carbonate having a BET specific surface area of 9 m²/g.

Comparative Example 5

In this comparative example, surface treatment was performed, instead of using a fatty acid sodium salt, using a fatty acid.

A surface-treated calcium carbonate was produced in the same manner as in Example 1 described above, using 70 g of mixed fatty acid in which 35 g of lauric acid, 17.5 g of stearic acid, and 17.5 g of palmitic acid were mixed (50% lauric acid, 25% stearic acid, and 25% palmitic acid).

Comparative Example 6

In this comparative example, surface treatment was performed, instead of using a fatty acid sodium salt, using a fatty acid and an emulsifier.

A surface-treated calcium carbonate was produced in the same manner as in Example 1 described above except for the use of 70 g of mixed fatty acid in which 35 g of lauric acid, 17.5 g of stearic acid, and 17.5 g of palmitic acid were mixed (50% lauric acid, 25% stearic acid, and 25% palmitic acid) and 0.8 g of dodecylbenzenesulfonic acid as an emulsifier.

Comparative Example 7

A surface-treated calcium carbonate was produced in the same manner as in Example 1 described above except for the use of 70 g of mixed fatty acid sodium salt in which 33.6 g of sodium laurate, 28 g of sodium myristate, 4.2 g of sodium palmitate, and 4.2 g of sodium stearate were mixed (48% sodium laurate, 40% sodium myristate, 6% sodium palmitate, and 6% sodium stearate).

[Measurement of BET Specific Surface Area]

Each calcium carbonate before and after the surface treatment was measured in terms of BET specific surface area. The BET specific surface area was measured with a specific surface area measurement apparatus FlowSorb 112300 (manufactured by Micromeritics Instrument Corporation). The measurement results are shown in Table 1.

[Measurement of Amount of Extracted Fatty Acid]

The surface-treated calcium carbonates of Examples 1 to 7 and Comparative Examples 1 to 7 were measured in terms of amount of extracted fatty acid. An amount of 15 g of each surface-treated calcium carbonate was put into a Soxhlet extractor, and free fatty acid and free fatty acid salt in the surface-treated calcium carbonate were extracted with 100 ml of diethyl ether. The amount of extracted fatty acid was determined from a change in weight of the surface-treated calcium carbonate between before and after the extraction and the sample weight of the surface-treated calcium carbonate. The measurement results are shown in Table 1.

Note that "Lauric acid", "Myristic acid", "Palmitic acid", "Stearic acid", and "Oleic acid" indicated in Table 1 represent the respective contents of sodium salts of these fatty acids in Examples 1 to 7 and Comparative Examples 1 to 4 and 7 and represent the respective contents of these fatty acids in Comparative Examples 5 and 6.

<Viscosity Test for DOP Sol>

In relation to surface-treated calcium carbonates of Examples 1 to 7 and Comparative Examples 1 to 7, DOP sols were produced and measured in terms of viscosity. Each sol was obtained by stirring 100 g of surface-treated calcium carbonate and 100 g of DOP (dioctyl phthalate manufactured by J-PLUS Co., Ltd.) with a hybrid mixer (HM-500 manufactured by Keyence Corporation) for 40 seconds, and the initial viscosity of the resultant DOP sol was measured at 20° C. Furthermore, the viscosity thereof after being kept at 20° C. for 7 days was also measured at 20° C. The viscosity was measured with a BH viscometer (manufactured by Tokimec, Inc.) at 2 rpm and 20 rpm. The measurement results are shown in Table 1. Note that Rate of Viscosity Rise represents the rate of rise in viscosity from just after being kneaded to 7 days after being kneaded.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| BET Specific Surface Area (m²/g) | Before surface treatment | 24 | 20 | 24 | 24 | 24 | 35 | 24 |
|  | After surface treatment | 19.8 | 16.9 | 21.3 | 20.9 | 21.4 | 34.8 | 20.2 |
| Amount of Fatty Acid Treated (pbw) |  | 3.5 | 3.5 | 3.5 | 3.5 | 3.5 | 10.0 | 3.5 |
| Lauric acid (%) |  | 50 | 50 | 50 | 35 | 60 | 50 | 50 |
| Myristic acid (%) |  | 0 | 0 | 0 | 0 | 0 | 0 | 16 |
| Palmitic acid (%) |  | 25 | 25 | 23.4 | 32.5 | 20 | 25 | 17 |
| Stearic acid (%) |  | 25 | 25 | 23.6 | 32.5 | 20 | 25 | 17 |
| Oleic acid (%) |  | 0 | 0 | 3 | 0 | 0 | 0 | 2 |
| Amount of Extracted Fatty Acid (%) |  | 0.12 | 0.16 | 0.19 | 0.12 | 0.18 | 0.19 | 0.17 |
| Just After Kneaded |  |  |  |  |  |  |  |  |
| 2 rpm (Pa·s) |  | 742 | 650 | 705 | 802 | 663 | 851 | 725 |
| 20 rpm (Pa·s) |  | 93 | 88 | 98 | 111 | 90 | 105 | 98 |
| 2 rpm/20 rpm |  | 8 | 7.4 | 7.2 | 7.2 | 7.4 | 8.1 | 7.4 |
| 7 Days After |  |  |  |  |  |  |  |  |
| 2 rpm (Pa·s) |  | 744 | 656 | 662 | 805 | 666 | 849 | 718 |
| 20 rpm (Pa·s) |  | 96 | 89 | 96 | 113 | 90 | 106 | 97 |
| 2 rpm/20 rpm |  | 7.8 | 7.4 | 6.9 | 7.1 | 7.4 | 8 | 7.4 |
| Rate of Viscosity Change |  |  |  |  |  |  |  |  |
| 2 rpm (%) |  | 101 | 101 | 94 | 100 | 100 | 100 | 99 |
| 20 rpm (%) |  | 103 | 101 | 98 | 101 | 100 | 101 | 99 |

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| BET Specific Surface Area (m²/g) | Before surface treatment | 24 | 24 | 24 | 9 | 24 | 24 | 24 |
|  | After surface treatment | 21.0 | 20.4 | 21.7 | 8.8 | 19.7 | 20.3 | 19.5 |
| Amount of Fatty Acid Treated (pbw) |  | 3.5 | 3.5 | 3.5 | 3.5 | 3.5 | 3.5 | 3.5 |
| Lauric acid (%) |  | 70 | 20 | 50 | 50 | 50 | 50 | 48 |
| Myristic acid (%) |  | 0 | 0 | 0 | 0 | 0 | 0 | 40 |
| Palmitic acid (%) |  | 15 | 40 | 21.5 | 25 | 25 | 25 | 6 |
| Stearic acid (%) |  | 15 | 40 | 21.5 | 25 | 25 | 25 | 6 |
| Oleic acid (%) |  | 0 | 0 | 7 | 0 | 0 | 0 | 0 |
| Emulsifier (pbw) |  | 0 | 0 | 0 | 0 | 0 | 0.04 | 0 |
| Amount of Extracted Fatty Acid (%) |  | 0.20 | 0.13 | 0.28 | 0.38 | 0.54 | 0.49 | 0.21 |
| Just After Kneaded |  |  |  |  |  |  |  |  |
| 2 rpm (Pa·s) |  | 283 | 2048 | 637 | 365 | 450 | 548 | 584 |
| 20 rpm (Pa·s) |  | 63 | 272 | 91 | 126 | 115 | 122 | 130 |
| 2 rpm/20 rpm |  | 4.5 | 7.5 | 7 | 2.9 | 3.9 | 4.5 | 4.5 |
| 7 Days After |  |  |  |  |  |  |  |  |
| 2 rpm (Pa·s) |  | 308 | 1992 | 486 | 340 | 637 | 690 | 613 |
| 20 rpm (Pa·s) |  | 74 | 268 | 72 | 117 | 159 | 160 | 143 |
| 2 rpm/20 rpm |  | 4.2 | 7.4 | 6.8 | 2.9 | 4 | 4.3 | 4.3 |
| Rate of Viscosity Change |  |  |  |  |  |  |  |  |
| 2 rpm (%) |  | 109 | 97 | 76 | 93 | 142 | 126 | 105 |
| 20 rpm (%) |  | 117 | 98 | 79 | 93 | 128 | 131 | 110 |

As is obvious from Table 1, it can be understood that the DOP sols using the surface-treated calcium carbonates of Examples 1 to 7 formulated in accordance with the present invention exhibit low viscosity and good thixotropy. In addition, it can be seen that the DOP sols also have excellent storage stability.

In contrast, in Comparative Example 1 in which sodium laurate is contained more than the range defined in the present invention, the thixotropy is low as compared to Examples 1 to 7.

It is also shown that in Comparative Example 2 in which the content of sodium laurate is smaller than the range defined in the present invention, good thixotropy is obtained but the viscosity is high.

Furthermore, it is shown that in Comparative Example 3 in which sodium oleate is contained more than the range defined in the present invention, the 7-day viscosity is decreased, resulting in inferiority in storage stability to Examples 1 to 7.

In Comparative Example 4 in which the BET specific surface area of the surface-treated calcium carbonate is smaller than the range defined in the present invention, good thixotropy is not obtained.

It is also shown that in Comparative Example 5 in which a lauric acid and other fatty acids are treated not in the form of a sodium salt or potassium salt but in an acid form, good thixotropy is not obtained and the 7-day viscosity is increased, resulting in inferiority in storage stability.

Furthermore, it is shown that also in Comparative Example 6 in which an emulsifier is used and fatty acids are treated in an acid form, good thixotropy is not obtained and the 7-day viscosity is increased, resulting in inferiority in storage stability.

<Viscosity Test for PPG Sol>

In relation to surface-treated calcium carbonates of Examples 1 to 7 and Comparative Examples 1 to 7, PPG (polypropylene glycol) sols were measured in terms of viscosity. Each PPG sol was formulated by fully kneading 200 g of surface-treated calcium carbonate and 200 g of PPG (polypropylene glycol, trade name "Sumiphen 3086" manufactured by Sumika Bayer Urethane Co., Ltd.), and the initial viscosity and 7-day viscosity of the resultant PPG sol were measured in the same manner as described above. The measurement results are shown in Table 2.

TABLE 2

|  | Ex. 1 | Ex. 2 | Ex. 3 | Ex. 4 | Ex. 5 | Ex. 6 | Ex. 7 |
|---|---|---|---|---|---|---|---|
| Just After Kneaded | | | | | | | |
| 2 rpm (Pa · s) | 803 | 756 | 783 | 852 | 732 | 888 | 779 |
| 20 rpm (Pa · s) | 107 | 95 | 112 | 117 | 100 | 117 | 115 |
| 2 rpm/20 rpm | 7.5 | 8.0 | 7.0 | 7.3 | 7.4 | 7.6 | 6.8 |
| 7 Days After | | | | | | | |
| 2 rpm (Pa · s) | 759 | 758 | 736 | 865 | 740 | 879 | 782 |
| 20 rpm (Pa · s) | 104 | 96 | 110 | 120 | 100 | 116 | 113 |
| 2 rpm/20 rpm | 7.1 | 7.9 | 6.7 | 7.2 | 7.4 | 7.6 | 6.9 |
| Rate of Viscosity Change | | | | | | | |
| 2 rpm (%) | 98 | 100 | 94 | 102 | 101 | 99 | 100 |
| 20 rpm (%) | 97 | 101 | 98 | 103 | 100 | 99 | 98 |

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Just After Kneaded | | | | | | | |
| 2 rpm (Pa · s) | 420 | 1476 | 852 | 486 | 518 | 562 | 608 |
| 20 rpm (Pa · s) | 81 | 192 | 105 | 157 | 126 | 134 | 148 |
| 2 rpm/20 rpm | 5.2 | 7.7 | 8.1 | 3.1 | 4.1 | 4.2 | 4.1 |
| 7 Days After | | | | | | | |
| 2 rpm (Pa · s) | 448 | 1509 | 726 | 572 | 694 | 708 | 625 |
| 20 rpm (Pa · s) | 90 | 198 | 93 | 204 | 174 | 165 | 156 |
| 2 rpm/20 rpm | 5.0 | 7.6 | 7.8 | 2.8 | 4.0 | 4.3 | 4.0 |
| Rate of Viscosity Change | | | | | | | |
| 2 rpm (%) | 107 | 102 | 85 | 118 | 134 | 126 | 103 |
| 20 rpm (%) | 103 | 103 | 89 | 130 | 138 | 123 | 105 |

In Comparative Examples 5 and 6, the amount of extracted fatty acid is higher than 0.4% by weight. This can be attributed to the fact that since the fatty acids were treated in an acid form, their reaction with calcium carbonate did not progress well so that the amount of fatty acids attached as free fatty acids to the calcium carbonate became large. Furthermore, it can be considered that because of the large amount of free fatty acids, the storage stability is poor.

Moreover, it can be considered that since the fatty acids were treated in an acid form, the fatty acids could not be treated uniformly on the surface of calcium carbonate, which made the thixotropy inferior to Examples 1 to 7.

In Comparative Example 7, the total content of sodium laurate, sodium palmitate, and sodium stearate is less than 80% by weight. The total content of lauric acid sodium salt having a carbon number of 12 and myristic acid sodium salt having a carbon number of 14 is 88%. Since the contents of sodium palmitate having a carbon number of 16 and sodium stearate having a carbon number of 18 are smaller than the respective ranges defined in the present invention, good thixotropy is not obtained.

As is obvious from Table 2, it can be understood that the PPG sols using the surface-treated calcium carbonates of Examples 1 to 7 formulated in accordance with the present invention exhibit low viscosity and good thixotropy. In addition, it can be seen that the PPG sols also have excellent storage stability.

Generally, two-component polyurethane sealants use PPG as a curing agent and therefore the viscosity of two-component polyurethane sealants is highly correlated with the viscosity of PPG sols used therein. For this reason, it can be said that two-component polyurethane sealants using the surface-treated calcium carbonates of Examples 1 to 7 formulated in accordance with the present invention will exhibit high viscosity and good thixotropy.

<Viscosity Test for One-Component Modified Silicone Sealant>

In relation to surface-treated calcium carbonates of Examples 1 to 7 and Comparative Examples 1 to 7, one-component modified silicone sealants were prepared and measured in terms of viscosity. Each one-component modified silicone sealant was prepared by fully kneading 85 g of Hakuenka CCR (manufactured by Shiraishi Kogyo Kaisha, Ltd.), 100 g of modified silicone polymer (trade name "MS Polymer S203" manufactured by Kanegafuchi Kagaku Kogyo Kabushiki Kaisha), 50 g of DOP, 35 g of heavy calcium carbonate (trade name "Whiton 305" manufactured by Shiraishi Kogyo Kaisha, Ltd.), 15 g of surface-treated calcium carbonate, 3.4 g of trimethoxyvinylsilane (trade name "KBM #1003" manufactured by Shin-Etsu Chemical Co., Ltd.), and 2.5 g of catalyst (trade name "#918" manufactured by Sankyo Organic Chemicals Co., Ltd.). The initial viscosity and 7-day viscosity of the resultant one-component modified silicone sealant were measured in the same manner as described above. The measurement results are shown in Table 3.

component modified silicone sealants were prepared and measured in terms of viscosity. In formulating each two-component modified silicone sealant, the base material used was a mixture of 120 g of Hakuenka CCR (manufactured by Shiraishi Kogyo Kaisha, Ltd.), 35 g of modified silicone polymer (trade name "MS Polymer 5203" manufactured by Kanegafuchi Kagaku Kogyo Kabushiki Kaisha), 50 g of DOP, 20 g of heavy calcium carbonate (trade name "Whiton P-30" manufactured by Shiraishi Kogyo Kaisha, Ltd.), 15 g of surface-treated calcium carbonate, and 5 g of Epikote 828 (manufactured by Yuka-Shell Epoxy Kabushiki Kaisha), and the curing agent used was a mixture of 20 g of heavy calcium carbonate (trade name "Whiton P-30" manufactured by

TABLE 3

|  | Ex. 1 | Ex. 2 | Ex. 3 | Ex. 4 | Ex. 5 | Ex. 6 | Ex. 7 |
|---|---|---|---|---|---|---|---|
| Just After Kneaded |  |  |  |  |  |  |  |
| 2 rpm (Pa·s) | 210 | 189 | 204 | 254 | 195 | 243 | 222 |
| 20 rpm (Pa·s) | 28 | 24 | 26 | 35 | 26 | 31 | 28 |
| 2 rpm/20 rpm | 7.5 | 7.9 | 7.8 | 7.2 | 7.5 | 7.8 | 7.8 |
| 7 Days After |  |  |  |  |  |  |  |
| 2 rpm (Pa·s) | 212 | 192 | 190 | 262 | 198 | 248 | 230 |
| 20 rpm (Pa·s) | 28 | 24 | 25 | 36 | 26 | 32 | 30 |
| 2 rpm/20 rpm | 7.6 | 8.0 | 7.6 | 7.2 | 7.5 | 7.1 | 7.6 |
| Rate of Viscosity Change |  |  |  |  |  |  |  |
| 2 rpm (%) | 101 | 102 | 93 | 103 | 102 | 102 | 104 |
| 20 rpm (%) | 100 | 100 | 96 | 103 | 100 | 103 | 107 |

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Just After Kneaded |  |  |  |  |  |  |  |
| 2 rpm (Pa·s) | 156 | 540 | 220 | 106 | 154 | 186 | 206 |
| 20 rpm (Pa·s) | 35 | 72 | 30 | 26 | 44 | 47 | 52 |
| 2 rpm/20 rpm | 4.5 | 7.5 | 7.4 | 4.1 | 3.5 | 4.0 | 4.0 |
| 7 Days After |  |  |  |  |  |  |  |
| 2 rpm (Pa·s) | 262 | 530 | 173 | 105 | 232 | 255 | 210 |
| 20 rpm (Pa·s) | 35 | 72 | 25 | 26 | 61 | 59 | 54 |
| 2 rpm/20 rpm | 7.5 | 7.4 | 7.0 | 4.0 | 3.8 | 4.3 | 3.9 |
| Rate of Viscosity Change |  |  |  |  |  |  |  |
| 2 rpm (%) | 102 | 98 | 79 | 99 | 151 | 137 | 102 |
| 20 rpm (%) | 103 | 100 | 83 | 100 | 139 | 125 | 98 |

As is obvious from Table 3, it can be understood that the one-component modified silicone sealants using the surface-treated calcium carbonates of Examples 1 to 7 formulated in accordance with the present invention exhibit low viscosity and good thixotropy. In addition, it can be seen that the silicone sealants also have excellent storage stability.

<Viscosity Test for Two-Component Modified Silicone Sealant>

In relation to surface-treated calcium carbonates of Examples 1 to 7 and Comparative Examples 1 to 7, two- Shiraishi Kogyo Kaisha, Ltd.), 6.3 g of DOP, 3 g of tin octylate, and 0.7 g of laurylamine. Each of the base material and curing agent was fully kneaded and the base material of the resultant two-component modified silicone sealant was measured in terms of viscosity just after being kneaded and 7-day viscosity in the same manner as described above. Note that as for this evaluation the viscosity values were measured with a BH viscometer at 1 rpm and 10 rpm. The measurement results are shown in Table 4.

TABLE 4

|  | Ex. 1 | Ex. 2 | Ex. 3 | Ex. 4 | Ex. 5 | Ex. 6 | Ex. 7 |
|---|---|---|---|---|---|---|---|
| Just After Kneaded |  |  |  |  |  |  |  |
| 1 rpm (Pa·s) | 325 | 380 | 392 | 416 | 296 | 432 | 402 |
| 10 rpm (Pa·s) | 44 | 48 | 48 | 59 | 39 | 57 | 50 |
| 1 rpm/10 rpm | 7.4 | 7.9 | 8.2 | 7.0 | 7.5 | 7.6 | 8.1 |

TABLE 4-continued

| 7 Days After | | | | | | | |
|---|---|---|---|---|---|---|---|
| 1 rpm (Pa · s) | 330 | 382 | 359 | 420 | 308 | 426 | 410 |
| 10 rpm (Pa · s) | 45 | 48 | 44 | 59 | 41 | 57 | 51 |
| 1 rpm/10 rpm | 7.3 | 8.0 | 8.2 | 7.1 | 7.6 | 7.5 | 8.0 |
| Rate of Viscosity Change | | | | | | | |
| 1 rpm (%) | 102 | 101 | 92 | 101 | 104 | 99 | 102 |
| 10 rpm (%) | 102 | 100 | 92 | 100 | 105 | 100 | 99 |

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Just After Kneaded | | | | | | | |
| 1 rpm (Pa · s) | 253 | 665 | 390 | 236 | 246 | 305 | 316 |
| 10 rpm (Pa · s) | 49 | 91 | 125 | 56 | 56 | 64 | 72 |
| 1 rpm/10 rpm | 5.2 | 7.3 | 3.1 | 4.2 | 4.4 | 4.8 | 4.4 |
| 7 Days After | | | | | | | |
| 1 pm (Pa · s) | 266 | 620 | 312 | 251 | 303 | 347 | 320 |
| 10 rpm (Pa · s) | 52 | 85 | 104 | 61 | 69 | 71 | 70 |
| 1 rpm/10 rpm | 5.1 | 7.3 | 3.0 | 4.1 | 4.4 | 4.9 | 4.6 |
| Rate of Viscosity Change | | | | | | | |
| 1 rpm (%) | 105 | 93 | 80 | 106 | 123 | 114 | 101 |
| 10 rpm (%) | 106 | 93 | 83 | 109 | 117 | 111 | 97 |

As is obvious from Table 4, it can be understood that the base materials of the two-component modified silicone sealants using the surface-treated calcium carbonates of Examples 1 to 7 formulated in accordance with the present invention exhibit low viscosity and good thixotropy. In addition, it can be seen that the base materials also have excellent storage stability. Furthermore, these viscosity properties of the base materials were similarly achieved also just after they were mixed with the respective curing agents.

<Viscosity Test for Polyvinyl Chloride Sol>

In relation to surface-treated calcium carbonates of Examples 1 to 7 and Comparative Examples 1 to 7, polyvinyl chloride sols were prepared and measured in terms of viscosity. Each polyvinyl chloride sol was prepared by fully kneading 200 g of surface-treated calcium carbonate, 300 g of polyvinyl chloride resin (trade name "ZEST P21" manufactured by Shin Dai-ichi Vinyl Corporation), 300 g of DINP, 150 g of heavy calcium carbonate (trade name "Whiton P-30" manufactured by Shiraishi Kogyo Kaisha, Ltd.), 10 g of tackifier (trade name "Versamid 140" manufactured by Henkel Japan Ltd.), and 40 g of diluent (trade name "Mineral Turpentine" manufactured by Yamakei Sangyo K.K.). The resultant polyvinyl chloride sol was measured in terms of initial viscosity and 7-day viscosity in the same manner as described above. The measurement results are shown in Table 5.

TABLE 5

| | Ex. 1 | Ex. 2 | Ex. 3 | Ex. 4 | Ex. 5 | Ex. 6 | Ex. 7 |
|---|---|---|---|---|---|---|---|
| Just After Kneaded | | | | | | | |
| 2 rpm (Pa · s) | 280 | 252 | 298 | 320 | 313 | 222 | 289 |
| 20 rpm (Pa · s) | 36 | 34 | 38 | 42 | 39 | 30 | 38 |
| 2 rpm/20 rpm | 7.8 | 7.4 | 7.8 | 7.6 | 8.0 | 7.4 | 7.6 |
| 7 Days After | | | | | | | |
| 2 rpm (Pa · s) | 296 | 257 | 288 | 332 | 322 | 226 | 292 |
| 20 rpm (Pa · s) | 38 | 35 | 36 | 43 | 40 | 31 | 37 |
| 2 rpm/20 rpm | 7.8 | 7.3 | 7.7 | 7.7 | 8.1 | 7.3 | 7.8 |
| Rate of Viscosity Change | | | | | | | |
| 2 rpm (%) | 106 | 102 | 93 | 104 | 103 | 102 | 101 |
| 20 rpm (%) | 106 | 103 | 95 | 102 | 103 | 103 | 97 |

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Just After Kneaded | | | | | | | |
| 2 rpm (Pa · s) | 198 | 602 | 274 | 105 | 218 | 230 | 254 |
| 20 rpm (Pa · s) | 41 | 90 | 38 | 26 | 43 | 43 | 56 |
| 2 rpm/20 rpm | 4.8 | 6.7 | 7.3 | 4.0 | 5.1 | 5.4 | 4.5 |

TABLE 5-continued

| 7 Days After | | | | | | | |
|---|---|---|---|---|---|---|---|
| 2 rpm (Pa · s) | 205 | 586 | 237 | 121 | 264 | 266 | 259 |
| 20 rpm (Pa · s) | 41 | 86 | 34 | 28 | 55 | 48 | 59 |
| 2 rpm/20 rpm | 5.0 | 6.8 | 7.0 | 4.3 | 4.8 | 5.5 | 4.4 |
| Rate of Viscosity Change | | | | | | | |
| 2 rpm (%) | 104 | 97 | 86 | 115 | 121 | 116 | 102 |
| 20 rpm (%) | 100 | 96 | 89 | 108 | 128 | 112 | 105 |

As is obvious from Table 5, it can be understood that the polyvinyl chloride sols using the surface-treated calcium carbonates of Examples 1 to 7 formulated in accordance with the present invention exhibit low viscosity and good thixotropy. In addition, it can be seen that the polyvinyl chloride sols also have excellent storage stability.

(Viscosity Test for Acrylic Sol)

In relation to surface-treated calcium carbonates of Examples 1 to 7 and Comparative Examples 1 to 7, acrylic sols were prepared and measured in terms of viscosity. Each acrylic sol was formulated and prepared by fully kneading 150 g of surface-treated calcium carbonate, 300 g of acrylic resin, 300 g of DINP, 100 g of heavy calcium carbonate (trade name "Whiton P-30" manufactured by Shiraishi Kogyo Kaisha, Ltd.), 50 g of diluent (trade name "Mineral Turpentine" manufactured by Yamakei Sangyo K.K.), 100 g of tackifier (trade name "Versamid 140" manufactured by Henkel Japan Ltd.), and 2.5 g of isocyanate resin. The resultant acrylic sol was measured in terms of initial viscosity and 7-day viscosity in the same manner as described above. The measurement results are shown in Table 6.

As is obvious from Table 6, it can be understood that the acrylic sols using the surface-treated calcium carbonates of Examples 1 to 7 formulated in accordance with the present invention exhibit low viscosity and good thixotropy. In addition, it can be seen that the acrylic sols also have excellent storage stability.

As described so far, when the surface-treated calcium carbonate formulated in accordance with the present invention is incorporated into a paste resin, low viscosity and high thixotropy can be imparted to the paste resin. In addition, the paste resin can obtain excellent storage stability.

Although the above examples have described those in which the surface-treated calcium carbonate according to the present invention is incorporated into various paste resin compositions, the surface-treated calcium carbonate has already been proven, also in the case that it is incorporated into a printing ink and a paint, to be capable of imparting low viscosity and high thixotropy to them and offer excellent storage stability, like the above.

TABLE 6

| | Ex. 1 | Ex. 2 | Ex. 3 | Ex. 4 | Ex. 5 | Ex. 6 | Ex. 7 |
|---|---|---|---|---|---|---|---|
| Just After Kneaded | | | | | | | |
| 2 rpm (Pa · s) | 202 | 182 | 221 | 225 | 185 | 231 | 228 |
| 20 rpm (Pa · s) | 28 | 24 | 30 | 31 | 26 | 33 | 32 |
| 2 rpm/20 rpm | 7.2 | 7.6 | 7.4 | 7.3 | 7.0 | 7.0 | 7.2 |
| 7 Days After | | | | | | | |
| 2 rpm (Pa · s) | 211 | 186 | 212 | 226 | 192 | 233 | 232 |
| 20 rpm (Pa · s) | 29 | 25 | 29 | 32 | 28 | 34 | 31 |
| 2 rpm/20 rpm | 7.3 | 7.4 | 7.2 | 7.1 | 6.9 | 6.9 | 7.4 |
| Rate of Viscosity Change | | | | | | | |
| 2 rpm (%) | 104 | 102 | 96 | 100 | 104 | 101 | 102 |
| 20 rpm (%) | 104 | 104 | 97 | 103 | 108 | 103 | 97 |
| | Comp. Ex. 1 | Comp. Ex. 2 | Comp. Ex. 3 | Comp. Ex. 4 | Comp. Ex. 5 | Comp. Ex. 6 | Comp. Ex. 7 |
| Just After Kneaded | | | | | | | |
| 2 rpm (Pa · s) | 153 | 422 | 203 | 102 | 162 | 176 | 168 |
| 20 rpm (Pa · s) | 39 | 57 | 30 | 26 | 42 | 38 | 40 |
| 2 rpm/20 rpm | 3.9 | 7.4 | 6.8 | 3.9 | 3.9 | 4.6 | 4.2 |
| 7 Days After | | | | | | | |
| 2 rpm (Pa · s) | 158 | 388 | 178 | 112 | 222 | 236 | 171 |
| 20 rpm (Pa · s) | 40 | 53 | 27 | 28 | 54 | 51 | 43 |
| 2 rpm/20 rpm | 4.0 | 7.3 | 6.5 | 4.0 | 4.1 | 4.6 | 4.0 |
| Rate of Viscosity Change | | | | | | | |
| 2 rpm (%) | 104 | 92 | 88 | 110 | 137 | 134 | 102 |
| 20 rpm (%) | 103 | 93 | 90 | 108 | 129 | 134 | 108 |

REFERENCE SIGNS LIST

1 ... calcium carbonate
2 ... lauric acid
3 ... palmitic acid and/or stearic acid
4 ... organic material chain in matrix resin

The invention claimed is:

1. A surface-treated calcium carbonate that is a calcium carbonate surface-treated with a surface treatment agent containing a sodium salt or potassium salt of a fatty acid, wherein the total content of a sodium salt and a potassium salt of lauric acid, a sodium salt and a potassium salt of palmitic acid and a sodium salt and a potassium salt of stearic acid in the surface treatment agent is 80% by weight or more, the content of the sodium salt and potassium salt of lauric acid is within the range of 30% to 60% by weight, the content of a sodium salt and a potassium salt of an unsaturated fatty acid in the surface treatment agent is 5% by weight or less, and the BET specific surface area of the surface-treated calcium carbonate is 10 $m^2/g$ or more.

2. The surface-treated calcium carbonate according to claim 1, wherein a sodium salt or potassium salt of an additional fatty acid is a sodium salt or potassium salt of a fatty acid having a carbon number of 14 to 22.

3. The surface-treated calcium carbonate according to claim 1, wherein the BET specific surface area thereof is 10 to 100 $m^2/g$.

4. The surface-treated calcium carbonate according to claim 1, wherein 100 parts by weight of the calcium carbonate is treated with 2 to 15 parts by weight of the surface treatment agent.

5. The surface-treated calcium carbonate according to claim 1, wherein the amount of extracted fatty acid obtained by subjecting the surface-treated calcium carbonate to extraction with diethyl ether is 0.4% by weight or less.

6. A polyurethane paste resin composition containing the surface-treated calcium carbonate according to claim 1.

7. A modified silicone paste resin composition containing the surface-treated calcium carbonate according to claim 1.

8. A polysulfide paste resin composition containing the surface-treated calcium carbonate according to claim 1.

9. A polyvinyl chloride sol resin composition containing the surface-treated calcium carbonate according to claim 1.

10. A acrylic sol resin composition containing the surface-treated calcium carbonate according to claim 1.

11. A printing ink composition containing the surface-treated calcium carbonate according to claim 1.

12. A paint composition containing the surface-treated calcium carbonate according to claim 1.

* * * * *